United States Patent
Hiller-Brod et al.

(10) Patent No.: US 12,481,276 B2
(45) Date of Patent: Nov. 25, 2025

(54) METHOD FOR PARAMETERISING AT LEAST ONE DEVICE

(71) Applicant: Balluff GmbH, Neuhausen a.d.F. (DE)

(72) Inventors: Andrea Hiller-Brod, Weilheim (DE); Albert Dorneich, Ostfildern (DE); Roland Schaefer, Rottweil (DE); Stephan Langer, Filderstadt (DE); Heiko Mahr, Renningen (DE); Jochen Streib, Ostfildern (DE); Joerg Maier, Filderstadt (DE)

(73) Assignee: BALLUFF GMBH, Neuhausen ADF (DE)

( * ) Notice: Subject to any disclaimer, the term of this patent is extended or adjusted under 35 U.S.C. 154(b) by 571 days.

(21) Appl. No.: 17/948,414

(22) Filed: Sep. 20, 2022

(65) Prior Publication Data

US 2023/0091191 A1    Mar. 23, 2023

(30) Foreign Application Priority Data

Sep. 22, 2021   (DE) .......................... 102021124582.6

(51) Int. Cl.
*G06V 10/82*   (2022.01)
*G05B 19/418*   (2006.01)
*G06F 18/2135*   (2023.01)

(52) U.S. Cl.
CPC ... *G05B 19/41885* (2013.01); *G06F 18/2135* (2023.01); *G05B 2219/23227* (2013.01); *G05B 2219/23236* (2013.01)

(58) Field of Classification Search
CPC .... G05B 19/41885; G05B 2219/23227; G05B 2219/23236; G05B 19/00; G06F 18/2135
See application file for complete search history.

(56) References Cited

U.S. PATENT DOCUMENTS

| | | | |
|---|---|---|---|
| 2005/0268012 A1* | 12/2005 | Schaetzle | G06F 13/4208 710/110 |
| 2006/0026205 A1* | 2/2006 | Butterfield | G16H 20/10 |
| 2017/0351232 A1* | 12/2017 | Chen | G05B 19/00 |

(Continued)

FOREIGN PATENT DOCUMENTS

| | | | | |
|---|---|---|---|---|
| CN | 103454990 A | | 12/2013 | |
| CN | 107894065 A | * | 4/2018 | ............. F24F 11/46 |
| CN | 112443954 A | | 3/2021 | |

(Continued)

*Primary Examiner* — Thomas C Lee
*Assistant Examiner* — Michael V Farina
(74) *Attorney, Agent, or Firm* — GableGotwals

(57) ABSTRACT

In a method for parameterising at least one device (30), at least one environmental value (31) of the device is determined via at least one sensor and/or an automation component. It is checked whether parameters are allocated to the at least one environmental value in a parameter database (32). If parameters are allocated to the at least one environmental value (31) in the parameter database (32), the device (30) is parameterised with parameters from the parameter database (32). If no parameters are allocated to the at least one environmental value (31) in the parameter database (32), the device (30) is parameterised with new parameters. The new parameters are then allocated (54) to the at least one environmental value (31) in the parameter database (32).

11 Claims, 3 Drawing Sheets

(56) References Cited

U.S. PATENT DOCUMENTS

2019/0320025 A1* 10/2019 Breter .................. H04L 67/12
2020/0096994 A1* 3/2020 Cella .................. G05B 23/0289

FOREIGN PATENT DOCUMENTS

| CN | 113359628 A | 9/2021 |
| DE | 102011006784 A1 | 10/2012 |
| DE | 102018129942 A1 | 5/2020 |
| DE | 102018129944 A1 | 5/2020 |
| DE | 102019116664 A1 | 12/2020 |
| DE | 102019121800 B3 | 1/2021 |
| WO | 2008034410 A1 | 3/2008 |

* cited by examiner

METHOD FOR PARAMETERISING AT LEAST ONE DEVICE

CROSS-REFERENCE TO RELATED APPLICATIONS

This United States application claims priority to German Patent Application No. DE 10 2021 124 582.6 filed 22 Sep. 2021, which is incorporated herein by reference.

BACKGROUND OF THE INVENTION

The present invention relates to a method for parameterising at least one device. The present invention also relates to a computer program, which is configured to perform each step of the method, and a machine-readable storage medium on which the computer program is saved.

PRIOR ART

Different environmental conditions influence the efficiency of devices such as machines and systems, for example. Such devices have parameters which are used for the control and/or regulation of actuators and/or sensors of the device. However, the devices are subject to environmental influences, which can change, for example, across the day, with the seasons, or with weather conditions. As a result, the parameters must be continuously adjusted to adapt it to the changed environmental conditions. Such changes of parameters are done manually. Such a manual change of parameters has its own problems, however: that unauthorised changes of parameters on the device cannot be identified. Furthermore, there is a lack of documentation of changes.

Automated changes of parameters are then undertaken, if, for example, when changing a sensor of a device, a set of parameters secured with the new sensor for the operation is automatically downloaded. This secured set of parameters is, however, also static and does not adapt itself to the respective environmental conditions. The parameters must therefore be manually readjusted on the device, until the desired performance under the existing environmental conditions is achieved.

DE 10 2011 006 784 A1 describes a method for adjusting a system. This system includes several modes of operation. As long as certain sensor-monitored environmental values are within specified ranges, the system can be run in all modes of operation, so that all functions of the system are available to a user. However, if the environmental conditions leave the desired range, this indicates a system error. Too high a temperature can, for example, indicate that a motor is overheating, and too-strong vibrations can indicate that a product processed in the system has not been properly fastened. In the event that the occurrence of such an error is identified, the number of available modes of operation becomes limited. Firstly, individual system functions may only be available in reduced-power modes of operation, in order to reduce the risk of a system failure. On the other hand, individual functions can also be completely blocked while the environmental values remain outside the desired range. This method is automated, but can only react to known incident scenarios in a pre-programmed manner. If a fault occurs due to a previously unknown change of environmental conditions, it must be resolved via a manual intervention. This also applies if the same abnormal environmental conditions occur repeatedly.

DE 10 2019 121 800 B3 describes a method for operating a device with a sensor. A data model of the sensor is created in a database. In this data model, an environmental value obtained from a secondary sensor element of the sensor is taken into account. While a primary sensor element serves to collect data, in accordance with the main function of the sensor, the function of the secondary sensor element is to recognise environmental influences on the sensor. The influence of these environmental influences on an ageing behaviour of the sensor had been previously determined and stored in the database. If the sensor is an optical sensor that has an optical sensor element as the primary sensor element and a temperature sensor element as the secondary sensor element, then, in the data model, the ageing of the primary sensor element will be simulated depending on the temperature. A sensor error is identified if the quality of the optical detection using the primary sensor element drops below a value that would be expected due to the ageing simulation. This method therefore only enables the identification of an occurrence of an error using environmental data, but does not enable an automated reaction to the occurrence of the error through changes of parameters. Furthermore, it is a prerequisite of this method that the connection between the observed environmental value and the ageing behaviour of the sensor is already known and has been stored in the database.

In DE 10 2019 116 664 A1, a method for the application-specific adaptation of a sensor to a process environment of automation technology is described. In this context, the sensor analyses a measurement signal in order to determine an application-specific process value. In a learning mode, a functional connection of the non-application-specific process value with an application-specific process value is sought. To this end, several sensors can be provided to collect various environmental values. This method therefore enables the adaptation of the operation of a sensor to environmental values collected via other sensors. It is, however, not suitable for an automated parameterisation of systems and machines.

DE 10 2018 129 942 A1 and DE 10 2018 129 944 A1 disclose a method and a device for monitoring an automation system. In this process, not only automation data from the automation system, but also environmental data from other sensors is collected. Using the environmental data, a quality value of the automation data can be created. For this, the connection between the environmental data and the quality of the automation data must, however, already be known and stored in a database.

It is an object of the present invention to provide a method for parameterising at least one device, in which the parameterisation can be carried out automatically. If in individual cases manual interventions should be necessary, the method should ensure that, in a future recurrence of the situation, no further user intervention will be necessary.

DISCLOSURE OF THE INVENTION

This object is solved, in one aspect of the invention, by an in particular computer-implemented method for parameterising at least one device. The term 'device' is understood to mean in particular a machine or system, which has at least one actuator. Preferably, the device is a production device for the food industry. A sensor should, however, in particular not be understood as a device to be parameterised for the purpose of the invention. The device does, however, have at least one sensor, said sensor not however being parameterised in the method.

In the method, at least one environmental value of the device is determined by means of the at least one sensor and/or the automation component, which provides multiple pieces of secondary data. An environmental value is understood to be a value that quantifies an environmental condition of the device. Preferably, the environmental value is selected from the group consisting of temperature, humidity, in particular atmospheric humidity, pressure, in particular air pressure, flow rate, in particular air flow rate, chemical composition of a gas, in particular of the air, brightness, in particular due to sunlight, vibration, incline and electromagnetic field strength.

After the at least one environmental value has been determined, it is checked whether parameters are allocated to the at least one environmental value in a parameter database. The parameter database is, in one embodiment of the method, saved on a machine-readable storage medium of the device. In another embodiment of the invention, the parameter database is saved on a machine-readable storage medium, which is connected, wirelessly or by wire, with the device. This can also, in particular, be an IO-Link connection. A standard for an intelligent sensor/actuator interface with the designation "IO-Link" is standardised as an international open standard in the standard IEC 61131-9. IO-Link-Devices will be described accordingly via the description file IODD (IO-Link Device Description). The IODD as specification language is, furthermore, standardised as an open standard in the standard ISO 15745. In the existing "IO-Wireless-System-Extensions" specification, an IO-Link-Wireless-Master with fieldbus interface is also already described. An IO-Link provides a point-to-point serial connection for signal transmission between sensors and actuators and the IO level. Generally, an IO-Link-System transmits data between a so-called IO-Link-Master and a connected IO-Link-Device. Being an IO-Link-Master, both fieldbus modules and also PLC (programmable logic controller) interface modules are available.

Parameters are in particular understood to mean values which are used in a control and/or regulation of at least one actuator of the device.

If parameters are already allocated to the at least one environmental value in the parameter database, a parameterisation of the device is carried out using these parameters from the parameter database. Through a computer-implemented execution of the method, this parameterisation can also be automated, without the intervention of a user becoming necessary. In this context, parameterisation means that these parameters are provided to a control unit and/or control system of the device, which is configured to use the parameters. In providing these parameters, a parameter set previously used by the control and/or regulation system can optionally be overwritten.

If, on the other hand, no parameters are yet allocated to the at least one environmental value in the parameter database, then a parameterisation of the device occurs, with new parameters and in a different way. For this, the method provides different possibilities, in different embodiments, which are described below. The new parameters are then allocated to the at least one environmental value in the parameter database. If, during a later, new run of the method, an environmental value is again determined which corresponds to this environmental value, then parameters already stored in the parameter database can be used, and the parameterisation can, this time, run completely automatically. The method thus allows, on the one hand, a fully automated parameterisation of the device to be performed, if there are environmental values for the already-secured parameter sets stored in the parameter database; and on the other hand, if any new environmental conditions occur, the optimal parameters for these new environmental conditions to be learnt and the parameter database to be continuously expanded in this way. In this way, it is rare that the device comes to a halt, as necessary new parameterisations due to altered environmental conditions predominantly run automatically. The degree of automation of the parameterisation thereby increases with time.

Should a new device be put into operation, it is not necessary to manually connect this with an appropriate parameter database. Instead, it is preferred that, in an initialisation step of the method, the device and sensor and/or the automation component are each identified via digital identification data, which can be read from a network. The device is then automatically allocated with a parameter database provided for this type of device. Several parameter databases can be provided, depending on what environmental values can be collected by the at least one sensor and/or the automation component. A parameter database is then chosen for the installed combination of device and sensor and/or automation component, in which the parameters provided for this device are associated with environmental values that can actually be measured by the at least one available sensor and/or the automation component.

Due to the complexity of the relationship between environmental conditions and optimal parameters for the operation of a device, it is preferred that several environmental values are determined, and that it is checked whether parameters are allocated to a combination of all environmental values in the parameter data. It is therefore preferred that, in this context, an AND operation of the environmental values is used. When using several environmental values, it is preferable to avoid choosing parameters based only on one environmental value. However, individual environmental values which fall outside a desired range can be an indication that the current operating conditions of the device should be monitored more closely by a user, in order to avoid the occurrence of errors. It is therefore furthermore preferred that, where several environmental values are determined, a warning is issued if at least one of the environmental values is outside a desired range. In this case, it is therefore preferable that an OR operation of the environmental values is used.

To determine several environmental values, it can generally be provided that each environmental value is determined with a separate sensor or a separate automation component. It is, however, also possible to use sensors and/or automation components which have several sensor elements for determining different environmental values, so that a sensor or an automation component can determine several environmental values simultaneously.

In one embodiment of the method, the parameter database is set up as a dynamic parameter database. Output variables are determined from input variables using at least one algorithm and are written into the parameter database as parameters. It is especially preferred that the at least one algorithm is a deterministic, pre-programmed algorithm. This means that at least one mathematical function is stored in the parameter database, in which environmental values are used as arguments and parameters are used as function values. In this way, the function has degrees of freedom. The degrees of freedom are in particular coefficients in a series expansion or in a polynomial. The coefficients can, for example, be determined through curve fitting of model functions on measured curves.

In another embodiment of the method, the parameter database is set up as a one-dimensional look-up table, in which parameters are allocated to an environmental value, or it is set up as a multi-dimensional look-up table, in which parameters are allocated to a combination of environmental values. If a parameterisation of the device should occur in a situation in which no parameters are allocated to an environmental value in the one-dimensional look-up table, or no parameters are applied to a combination of several environmental values in the multi-dimensional look-up table, then the parameterisation of the device preferably occurs by intermediate values being interpolated. Furthermore, a parameterisation of the device can be carried out by extrapolating values.

In both the previously described embodiments of the method, it is possible that, if several environmental values are determined, there are combinations of parameters in the parameter database with a large enough number of environmental values that these direct parameters for the parameterisation of the device are only rarely taken, due to an accordance of all currently determined environmental values with a combination of environmental values in the parameter database. In order to achieve a higher success rate by targeting the parameter database, it is therefore preferred that, when allocating the parameters, dependencies between environmental values are analysed via Principal Component Analysis (PCA), and in doing this, new variables are defined, which are independent of each other. The new variables can be displayed in a list, in order of their significance. It is then possible to take only the most important variables into account. In this way, the parameters can be applied to fewer environmental values than are determined via the at least one sensor and/or the automation component.

In yet another embodiment of the method, the allocation of parameters occurs via a learning model (Machine Learning; ML). Such a learning model is referred to as a probabilistic model, and can be implemented through a neural network. All environmental values are, in this context, used as variables of an input layer. The parameters then come from an output later. Such a learning model has hidden layers between the input layer and the output layer. Nodes in the hidden layers are determined by weighting the summation of input nodes. The weightings can be determined in a training phase of the learning model. It is also possible that, to determine a parameter in the output layer, one or more environmental values hardly play a part in the input layer, because their weighting is very small, or even zero.

The learning model can also be implemented by other methods of machine learning. Vector support machine or random forest are suitable.

The learning model can, in particular, start from an original state in which the device is running without errors. This can be, for example, after its first operation, in the morning or at the start of a week. All parameters of this original state are saved in the parameter database and linked with the currently available environmental values. Threshold values and/or tolerance ranges can also be allocated to the environmental values, so that the parameter set is not only valid precisely under the existing environmental conditions, but can also be used if there are small variations in the environmental values. Threshold values for this can in particular be determined by static methods. To this end, the mean and the standard deviation of an environmental value are determined on a moving basis. An upper or lower threshold value is then obtained by adding the standard deviation to or subtracting it from the mean, wherein a multiplication of the standard deviation with a factor may be provided. This factor specifies the insensitivity of a parameter towards a certain environmental value. The more insensitive the reaction of a parameter to changes of a certain environmental value, the larger this factor can be chosen to be. If a learning phase of the device in which the parameter database is filled with values is provided before the device transitions into an operational phase, then the threshold values can also be automatically generated during the training phase. If, for example, the training method "vector support machine" is used in the training phase, then hyper surfaces will be formed in the area of environmental values, which separate states from one another. This then means that, whether by input from an operator or by the learning ability of an algorithm in the event of a warning or a problem based on the environmental values collected at this time, an adapted parameter set is stored in the parameter database, and the threshold values and/or tolerance ranges for this parameter set are simultaneously generated and, optionally, threshold values and/or tolerance ranges are adapted to other already-stored parameter sets.

In a further embodiment of the method, a parameterisation of the device with new parameters thereby enables a digital image of the device to be created in a situation in which there are no parameters yet allocated to the at least one environmental value in the parameter database. Such a digital image, which can also be referred to as a digital twin, maps the real device in the digital world, in order to predict its performance characteristics. The new parameters are then chosen in such a way that an actual state of the device is aligned with a target state of the device, as stored in the digital image. This can be done by simulating the operation. The parameters chosen in this way can subsequently be permanently connected with the currently determined environmental values, and be stored in the parameter database. Here, the parameters are always being updated in real time, by secondary data. An improvement in the degree of automation and the stability of the processes can thereby take place, without putting strain on the real device.

An advantage of the method consists, in all its embodiments, in that the parameter database is increasingly filled with parameters during operation of the device. This applies not only to a possible initial training phase, but also to the subsequent running operation of the device. Should a further device be put into operation which resembles a device already being operated using the method according to the invention and has the sensors and/or automation components, by means of which the same environmental values can be determined as those used for the parameterisation of the existing device, then the pre-existing parameter database can, advantageously, be made available to the new device. Each of the devices will then continuously further fill their copy of the parameter database with data, when new environmental conditions, which were previously unrecorded in the parameter database, appear.

In a second aspect, the invention relates to a computer program which is configured to carry out each step of the method. The computer program can run on a computing device or a control unit which is part of the device, or which is linked wirelessly or by wire with the device.

In a third aspect, the invention relates to a machine-readable storage medium, on which the computer program is saved. From this machine-readable storage medium, it can be transferred onto a computing device or control unit of a device. Preferably, parameter databases are also saved on the machine-readable storage medium, from which a suitable parameter database for the parameterisation of the device can be chosen.

BRIEF DESCRIPTION OF THE DRAWINGS

Exemplary embodiments of the invention are depicted in the drawings and are more precisely explained in the following description.

EXEMPLARY EMBODIMENTS OF THE INVENTION

Figure 1:
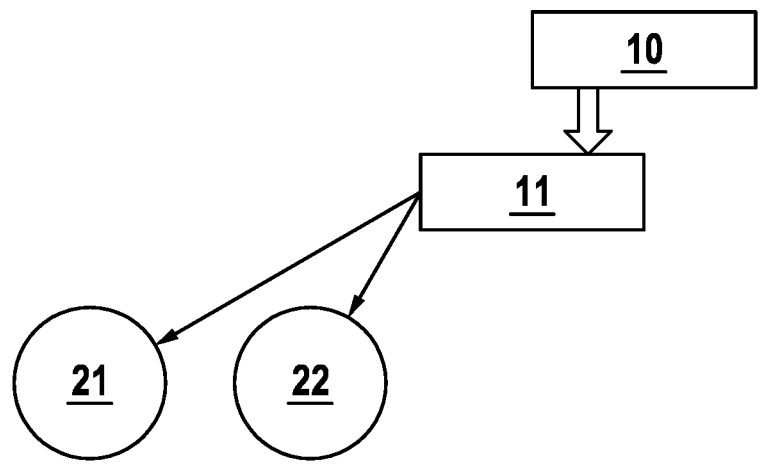
FIG. 1 shows a flow chart of a method according to the prior art.

FIG. 1 shows a common reaction of a machine to changing environmental conditions, according to the prior art. A change 10 of the environmental conditions leads to parameters of the machine 11 having to be adapted. Subsequently, two reactions are possible:

On the one hand, a manual change 21 of the parameters of the machine can be carried out by a user.

On the other hand, it is possible that a new set of parameters for the changed environmental conditions already exists. This is manually downloaded from a parameter database by a user 22 and supplied to the machine.

Both options lead to a temporary halt of the machine.

Figure 2:
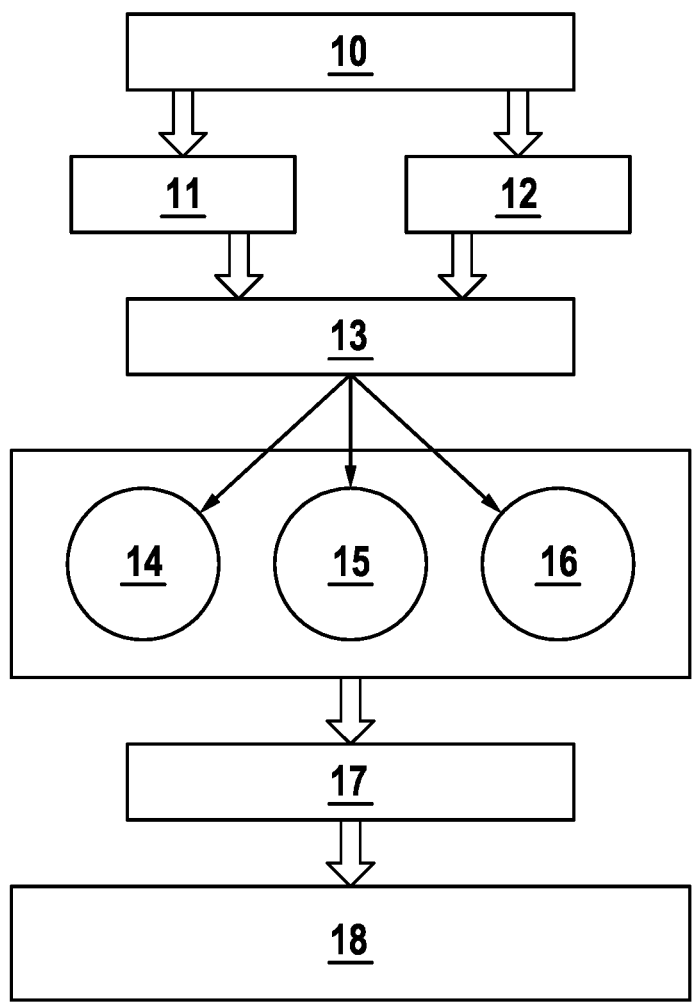
FIG. 2 shows a flow chart of a method according to an exemplary embodiment of the invention.

Various exemplary embodiments of the method according to the invention react to the change 10 of the environmental conditions in the way represented in FIG. 2. Here it is also necessary for parameters to be adapted 11. At the same time, it is possible that a model and/or a database of the machine are no longer up to date 12. Using sensors of the device, which are configured as automation components that supply multiple pieces of secondary data, a determination 13 of several environmental values of the device now takes place. A parameter database of the device is now searched through for a parameter set, which is allocated to the determined environmental values. If such a parameter set is not found, then the necessary parameters are determined via a dynamic parameter database 14, a learning model 15, or by dynamic adaptation of a digital image 16 in real time. Then a parameterisation 17 of the device is carried out, in which the new parameter set is made available to the device. Following this, the device continues operating 18 with the new parameters. This is possible without halting the device.

In an exemplary embodiment of the invention, the device is a production device for frozen fish. If the temperature changes as an environmental value, this affects the sliding behaviour of the frozen fish on a conveyor belt of the device. When introducing the frozen fish into a packing tube, the frozen fish can come to a standstill more quickly than usual. Consequently, a sealing tool does not hit the gap between two frozen fish, but rather hits a frozen fish in the packaging. This leads to the machine halting, waste, and possibly to the sealing tool being damaged. Conventionally, the cause of the error is investigated by the machine operator. The force of a pusher, which moves the frozen fish onto the conveyor belt, is in this case increased as a parameter. If this incident occurs in the method according to the invention, the problematic environmental value of the temperature is linked with the changed parameter of the force of the pusher in the parameter database. In the event of a reoccurrence of such a temperature, this parameter is automatically applied, so that future manual interventions can be avoided.

In another exemplary embodiment of the method according to the invention, the device is a moveable device in the form of a refuse truck. An environmental value determined in the method is also the temperature in this exemplary embodiment. Heating by solar radiation or cooling by weather conditions can lead to changes of the viscosity of a hydraulic oil in a hydraulic system of the refuse truck, as well as to elongation of mechanical components such as axles or rods. This leads to certain areas of the refuse truck not being reached by the rubbish compactor as desired. Instead, movements are too short or too long. In addition, there is deviation from the chronological sequences of the start-up profile. Based on the sensor readings of the temperature, and with the help of the further steps of the method according to this invention, the system pressure and volume flow can, as parameters of the hydraulic drive, be changed, so that endpoints are again approached with the desired accuracy.

In a further exemplary embodiment of the method, the device is a system for inserting carbon dioxide into food packaging. The volume of the gas depends on the temperature and the pressure of the gas. In pipe networks or industrial processes, these two variables are, however, not constant. The method according to the invention makes it possible to continuously adapt control parameters of the device on the basis of these environmental values, in order to enable an interference-free operation of the system and introduce the necessary amount of gas.

Figure 3:
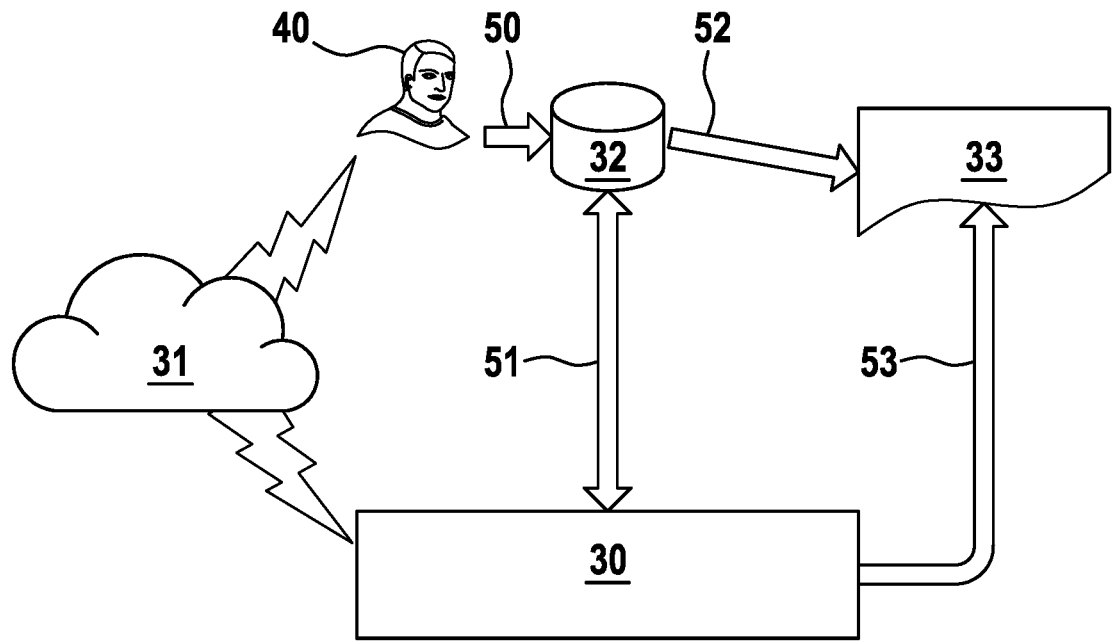
FIG. 3 schematically shows the course of an exemplary embodiment of the method according to the invention, in a training phase of a device.

If a learning process 15 is used in the method according to the invention, a training phase of the device can first be provided, before this is employed in an operational phase. The process of the training phase is represented in FIG. 3. The device 30 is influenced by external environmental values 31. If there are no parameters yet known for the operation of the device 30 under the existing environmental values 31, then a user 40 carries out an adaptation 50 of the parameters in a parameter database 32. Using these, a parameterisation 51 of the device 30 is then carried out. A read-out 52 of these parameters takes place, in order to make them available to a probabilistic model 33. The environmental values 31 are also made available to said model, as sensor readings 53 of the device 30.

Figure 4:
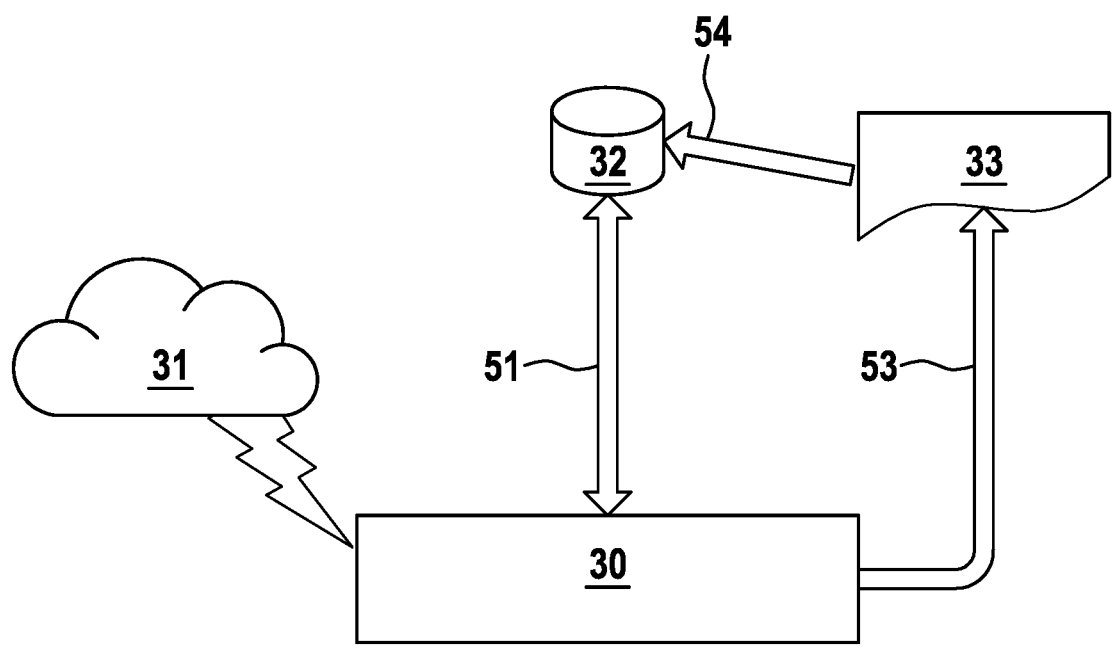
FIG. 4 schematically shows the course of an exemplary embodiment of the method according to the invention, in an operational phase of a device.

After completion of the training phase an operational phase is carried out, in accordance with FIG. 4. The device 30 continuously determines environmental values 31 via sensors. If there are already parameters stored in the parameter database 32 which are allocated to these environmental values 31 or which lie in the tolerance range around these environmental values 31, then the device 30 is parameterised 51 via these parameters. Otherwise, the environmental values 31 are transferred into the probabilistic model 33 as sensor readings 53, said model adapting the parameters for the existing environmental values 31 and making them available 54 to the parameter database 32. Then, a parameterisation 51 of the device 30 with these altered parameters takes place.

Figure 5:
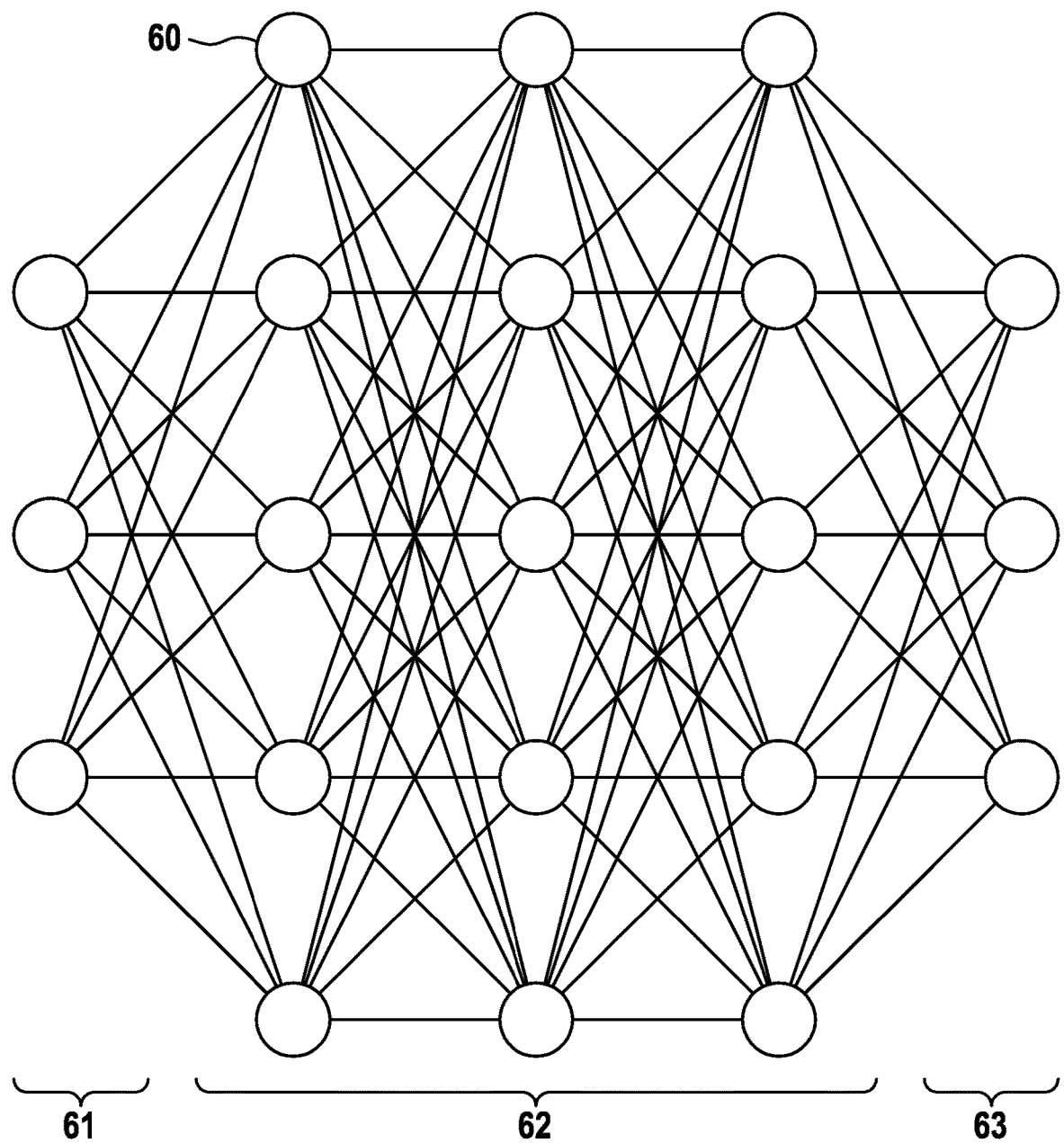
FIG. 5 schematically shows a learning model, which is used in a method according to an exemplary embodiment of the invention.

The probabilistic model 33 is a learning model that is implemented by a neural network, and whose structure is outlined in FIG. 5. It has an input layer 61, hidden layers 62 and an output layer 63. Each of the layers 61, 62, 63 consists of nodes 60. The environmental values 31, which are provided as sensor readings 53, are provided to the input layer 61, wherein each node 60 of the input layer 61 corresponds to an environmental value 31. This is shown for three environmental values 31. In each hidden layer 62, in all nodes of a layer an association of values with all values of the input layer 61 or with all values of the preceding hidden layer 62 takes place. Through a weighted summation of the environmental values 31, parameters for the device 30 are produced in the output layer 63. Alternatively to the weighting, non-linear functions can be used. This is shown with three nodes in the output layer 63, for three parameters.

In another exemplary embodiment of the method according to the invention, a deterministic model 14 is used to parameterise 51 the device 30, if there are no parameters yet associated with the current environmental values 31 stored in the parameter database 32. The method sequence here follows the depiction in FIG. 4, wherein the model 33 is not a probabilistic model, but rather the deterministic model.

In yet another exemplary embodiment of the method according to the invention, a digital image 16 of the device 30 is dynamically adapted in real time, in order to generate parameters for the device 30, should these not be present in the parameter database 32 for the current environmental values 31. In this digital image, the determined environmental values 31, the parameters of the device 30 and all automation values of the device 30, which suggest how the current parameters under the current environmental values 31 affect the operation of the device 30, are collected as fine-grained data. Further data for the description of the device 30 can be collected as coarse-grained data, in order to filter out important data for the generation of new parameters from the dataset available via the device 30.

A parameter database 32 filled with data and optionally the model 33 linked with it can, in all exemplary embodiments of the method of a device 30, be transferred to another device 30. To this end, a software agent recognises the device 30 and its sensors by means of identification data, with which it is also recognised what environmental values 31 can be determined during the operation of the device 30. The identification data can here be designed by the software agent, through a standardised protocol for the exchange of data via a network connection. In one exemplary embodiment of the method, this protocol can be OPC UA (Open Platform Communications Unified Architecture). The new device 30 to be put into operation is then provided with a pre-created parameter database 32 with an appropriate combination of environmental values 31 and parameters as well as, optionally, a model 33.

The invention claimed is:

1. A method for parameterising at least one device, comprising the following steps:
   determining at least one environmental value of the at least one device by means of at least one sensor or an automation component, which supplies multiple pieces of secondary data,
   checking whether parameters are allocated to the at least one environmental value in the parameter database,
   parameterising of the at least one device with parameters from the parameter database, if parameters are allocated to the at least one environmental value in the parameter database,
   parameterising of the at least one device with new parameters, if no parameters are allocated to the at least one environmental value in the parameter database, wherein new parameters are then allocated to the at least one environmental value in the parameter database, and the new parameters are stored in the parameter database,
   wherein in an initialisation step of the method, the at least one device and at least one sensor or the automation component are each identified via digital identification data, which can be read from a network, and the at least one device is then automatically allocated with a parameter database provided for this type of device, and
   wherein several parameter databases are to be provided, depending on what environmental values can be collected by the at least one sensor or automation component and a parameter database is chosen for the installed combination of device and sensor or automation component, in which the parameters provided for this device are associated with environmental values that can actually be measured by the at least one available sensor or the automation component.

2. The method according to claim 1, wherein the at least one environment value is selected from a group consisting of temperature, humidity, pressure, flow rate, chemical composition of a gas, brightness, vibration, incline and electromagnetic field strength.

3. The method according to claim 1, wherein several of the at least one environmental values are determined, and it is checked whether parameters are allocated to a combination of all environmental values in the parameter database.

4. The method according to claim 1, wherein at least one mathematical function is stored in the parameter database, in which function environmental values are used as arguments and parameters are used as function values, wherein the function has degrees of freedom.

5. The method according to claim 4, wherein, when allocating the parameters, dependencies between environmental values are analysed via Principal Component Analysis, and the parameters are applied to as few environmental values as are determined via the at least one sensor or the at least one automation component.

6. The method according to claim 1, wherein the parameter database is set up as a one-dimensional look-up table in which parameters are allocated to an environmental value, or is set up as a multi-dimensional look-up table, in which parameters are allocated to a combination of environmental values.

7. The method according to claim 1, wherein the allocation of parameters takes place via a learning model, which is implemented by a neural network and in which all environmental values are used as variables of an input layer and the parameters arise from an output layer.

8. The method according to claim 1, wherein a digital image of the at least one device is created and that the parameterisation of the at least one device with new parameters is carried out, in which process the new parameters are chosen in such a way that an actual state of the at least one device is aligned with a target state of the at least one device, as stored in the digital image.

9. The method according to claim 1, wherein the parameter database is filled with parameters during the operation of the at least one device and is then made available to another at least one device.

10. The method according to claim 1, including a computer program, configured to perform each step of the method.

11. The method according to claim 1, including a non-transitory machine-readable storage medium, on which the computer program is saved.

* * * * *